United States Patent [19]

Schmack

[11] Patent Number: 4,813,118

[45] Date of Patent: Mar. 21, 1989

[54] TOOL SYSTEM FOR CHANGING SHOCK ABSORBER CARTRIDGES

[76] Inventor: Bernhard Schmack, Fuldaer Strasse 71, D-6402 GroBenluder, Fed. Rep. of Germany

[21] Appl. No.: 692,641

[22] Filed: Jan. 16, 1985

[30] Foreign Application Priority Data

Jan. 18, 1984 [DE] Fed. Rep. of Germany ... 8401242[U]
Sep. 5, 1984 [DE] Fed. Rep. of Germany ... 8426127[U]

[51] Int. Cl.⁴ ............................................. B23P 19/04
[52] U.S. Cl. ..................................... 29/227; 254/10.5
[58] Field of Search .......................... 254/10.5; 29/227

[56] References Cited

U.S. PATENT DOCUMENTS

| | | | |
|---|---|---|---|
| 798,917 | 9/1905 | McDonald | 254/10.5 |
| 3,883,116 | 5/1975 | Buccino | 254/10.5 |
| 3,973,314 | 8/1976 | Schultz | 29/227 |
| 4,009,867 | 3/1977 | Diffenderfer | 254/10.5 |

FOREIGN PATENT DOCUMENTS

2490761 3/1982 France ................................... 29/227

*Primary Examiner*—Robert C. Watson
*Attorney, Agent, or Firm*—Henderson & Sturm

[57] ABSTRACT

A tool system for demounting and mounting shock absorber parts in order to change shock absorber cartridges in shock absorbers, and includes a tool for demounting and mouting the coil spring (1) of a vehicle shock absorbing leg, using a tool for demounting and mounting shock absorber closure screws, where the tool for the coil spring (1) of a vehicle suspension has two spring clamps, each of which has a threaded spindle (4) to one end of which a first spring engaging element (5) is fitted, a second spring engaging element (6) displaceable freely on the spindle, and a screw element (19) with which the second spring engaging element (6) is displaceable against the first spring engaging element (5) to compress the coil spring (1). The invention also relates to a tool (100), in particular for a tool system for changing shock absorber cartridges in shock absorbers, for demounting shock absorber closure springs having engagement holes or slots or edges located on their surfaces, with a central opening (140) running axially for the shock absorber piston rod to pass through and having pins or depressions (180) in a regular geometric arrangement on its underside.

6 Claims, 10 Drawing Sheets

TOOL SYSTEM FOR CHANGING SHOCK ABSORBER CARTRIDGES

TECHNICAL FIELD

The present invention relates to a tool system for demounting and mounting shock absorber parts in order to change shock absorber cartridges in shock absorbers.

BACKGROUND ART

Vehicle suspensions in general have a shock absorber which is surrounded by a coil spring. Such vehicle shock absorbing legs are disclosed, for example, in the book "How Does It Work?—The Car" from the Bibliographisches Institut, Mannheim, 1968, pages 166-167. At the lower end, this combination is attached to the wheel suspension, while its upper end is fitted directly to the bodywork of the vehicle. A kind of plate is generally arranged above the lower attachment point, and the coil spring is supported in it. The shock absorbers are generally guided in a shock absorber tube which is closed at the upper end by shock absorber closure screws. Such shock absorber closure screws have a central hole for the shock absorber piston rod to pass through. The shock absorber closure screws furthermore generally have engagement holes or engagement slots or engagement edges which act as points of application for unscrewing the shock absorber closure screws for demounting the shock absorber.

To release such shock absorber closure screws, tools are already known which have pins corresponding to the holes. These tools, however, have the disadvantage that they need a large lever arm to release the shock absorber screws, which are often corroded and dirty. In most cases, it is thus necessary to dismantle the whole suspension in order to demount a shock absorber. Besides the high cost in time and material, it is often necessary, when dismantling in this way, to measure and reset the front axle.

For dismantling, the coil spring surrounding the shock absorber of a suspension is compressed by means of a tool, the compressed coil spring is removed from the shock absorber, the upper shock absorber screw joint is opened by means of the tool, and the shock absorber is changed. The mounting process then essentially proceeds in the reverse order.

For compressing the spring, tools are in use which have two mutually separated spring clamps which are essentially set on the coil spring on opposite sides in order then, by means of the screw element located on the threaded spindle, to move together the two spring engagement elements which are designed, for example, as a kind of hooks directed towards each other, and thus to compress the spring between the engagement elements. Relatively large forces are necessary for this purpose.

Depending on the pitch of the individual turns of the coil spring, the tendency exists for the spring clamps to slip peripherally on the turns of the coil spring, so that they both come to lie on one side of the spring, so that the danger exits that the spring is released on the opposite side and jumps out of engagement with the tool, releasing the considerable deformation energy stored in the spring. This is a serious source of accidents to assembly personnel and can lead to extensive injuries.

DISCLOSURE OF THE INVENTION

The present invention relates to a tool system, for demounting and mounting shock absorber parts in order to change shock absorber cartridges in shock absorbers, and includes a tool for demounting and mounting the coil spring of a vehicle shock absorbing leg, using a tool for demounting and mounting shock absorber closure screws, where the tool for the coil spring of a vehicle suspension has two spring clamps, each of which has a threaded spindle to one end of which a first spring engaging element is fitted, a second spring engaging element displaceable freely on the spindle, and a screw element with which the second spring engaging element is displaceable against the first spring engaging element to compress the coil spring. The invention also relates to a tool, in particular for a tool system for changing shock absorber cartridges in shock absorbers, for demounting shock absorber closure springs having engagement holes or slots or edges located on their surfaces, with a central opening running axially for the shock absorber piston rod to pass through and having pins or depressions in a regular geometric arrangement on its underside.

The present invention has as an object, the creation of a tool system of the kind described in the beginning, which makes it possible to change shock absorber cartridges in shock absorbers built into a vehicle. Here the tool is to make possible a simple demounting of shock absorber closure screws, even when these are corroded or dirty, after the coil spring surrounding the shock absorber has been compressed by means of another tool which, on the one hand, always holds the two spring clamps substantially opposed on the coil spring, but on the other hand does not hinder the work on the suspension and makes it possible to pull out the compressed spring, and also to reinsert the spring, without problems.

This problem is solved, according to the invention, in that a spacer is provided to connect the two spring clamps and has two sleeves with which it can be pushed onto the threaded spindles of the spring clamps and which are connected together by a curved yoke.

When this tool is used, this spacer is pushed with its sleeves onto the threaded spindles of the spring clamps such that the sleeves are located between the second spring engagement elements, which are freely movable on the spindles, and the screw elements. The sleeves of the spacer are themselves likewise freely movable on the threaded spindles, but not to the same height, due to the pitch of the coil spring, since the spring engagement elements have a spacing of about a screw diameter from one another.

The spacer is designed such that the curved yoke extends essentially in one plane, which lies parallel to the line joining the points of application of the yoke on the periphery of the sleeves and perpendicular to a plane running parallel to the axis of the coil spring. The point of application of the yoke on the periphery of the sleeves is the midpoint of the yoke cross section, so that the curved yoke of the spacer extends about the shock absorbing leg in a plane essentially perpendicular to the axis of the vehicle suspension. The spacing between the sleeves of the spacer is dimensioned such that the sleeves lie outside the plate which is arranged below the coil spring of the shock absorbing leg. Tools of different dimensions can therefore be necessary for spring legs of different designs. The length of the individual sleeves can be different; in particular, for servicing reasons, the sleeve arranged on the lower spring engagement element, which engages the higher turn of the coil spring, can be made longer. It is then possible to arrange the yoke perpendicular to the axes of the sleeves and the axis of the coil spring. The danger of tilting during tightening up is, however, thereby increased. Sleeves of about the same length have therefore been found best, so that the yoke connecting the sleeves can, due to the pitch of the coil spring, lie in a plane which runs in a region between perpendicular to the axis of the coil spring and essentially parallel to the pitch of the coil spring.

In a preferred embodiment, the spring clamps are designed such that the first spring engagement elements, located at the top during the work and connected firmly to the threaded spindle, have a smaller spacing from the axis of the threaded spindle than the second spring engagement elements, movable on the spindle, and that their axis forms an acute angle with the normal to the yoke plane of the yoke. The spring clamps hence become placed, after being brought into engagement with the coil spring, somewhat obliquely to its axis, in that the threaded spindles have at their lower, free ends a greater spacing from one another than at their upper ends, provided with the first, fixed, spring engagement elements. This design has the effect that the lower ends of the threaded spindles extend unhindered past the above-mentioned plate. In this preferred embodiment, therefore, the sleeves of the spacer are also fitted on the yoke with a certain inclination. Since the inclination of the threaded spindles to the axis of the suspension varies according to the mutual spacing of the fixed and movable spring engagement elements, the danger also exists that the sleeves of the spacer tilt on the threaded spindles when the play between the internal diameter of these sleeves and the external diameter of the threaded spindles is not very large. However, for secure maintenance of the spacing, excessive play is undesired here.

The engagement elements of the spring clamps can be designed simply as round shaped hooks with or without planar longitudinal extension in the direction of the spring turn. In the latter case, a rotation of the threaded spindle with the engagement elements can easily take place, and stability is thereby reduced. Apart from this, with a simple hook without substantial longitudinal extension, the tension force loading is reduced in comparison with a hook with planar longitudinal extension. However, with an engagement element with planar longitudinal extension the danger exists, in particular with a steep pitch, that on tightening the upper engagement element only grips at one corner and, due to the high load and a rotation, jumps out of engagement with the spring turn, with all the disadvantageous consequences. Therefore, at least one of the sleeves of the spacer is fitted to the yoke such that its axis and the normal to the plane of the yoke lie in a first plane which runs perpendicular to the plane of the yoke and parallel to the line joining the points of application of the yoke, and/or that the axis and the normal of the plane of the yoke lie in a second plane which turns through the respective point of application and perpendicular to the first plane. This means that the sleeves can be inclined in the longitudinal direction of the line joining the points of application of the yoke at the periphery of the sleeve and in a direction perpendicular to the line joining the points of application. The inclination in the direction perpendicular to the line joining the points of application is given by the required dimensions for suspensions of different designs. Based on these considerations, the respective upper engagement element receives an inclination which substantially corresponds to the pitch of the coil turn, so that jumping out is prevented. Certain tolerances can be compensated for by use of two half yokes, due to the limited pivoting angle. The inclination in the longitudinal direction of the line joining the points of application essentially insures that the threaded spindles running through the sleeve can run past the said plate.

In a further particular embodiment, the sleeve axis deviates from the perpendicular to the plane of the yoke in a first plane which runs perpendicular to the plane of the yoke and parallel to the line joining the points of application of the yoke, for the upper sleeve in a region of up to 15° and for the lower sleeve in a region of up to 20°, and/or in a second plane, which runs perpendicular to the first plane and through the respective point of application, for the upper sleeve in a region of up to 6° and for the lower sleeve in a region of up to 20°. The sleeves can be inclined, considered from the middle of the yoke towards the sleeves, both to the right and to the left, or away from and towards the yoke, according to which inclination is precisely necessary for the dimensions of the spring concerned. Thus, for example, with increasing spring diameter and thus increasing spring stroke on compression, the angles between the sleeve and the yoke at the lower sleeve can change oppositely to the angles at the upper sleeve.

In a further preferred embodiment of the tool system, the yoke of the spacer hence consists of two half yokes, which are jointed together at their free ends remote from the sleeves. The pivoting motion of this articulated connection is restricted, however, to a limited pivot angle, which is sufficient to prevent tilting of the sleeves on the threaded spindles. The pivot angle of this articulate connection runs at about right angles to the axis of the suspension and also the line joining the points of application of the yoke to the sleeves of the spacer.

To facilitate the limited pivoting motion, the ends of the half yokes of the spacer are appropriately rotatably fitted, at a spacing from each other, to the inner side of the base of a U-profile piece, the shank arms of which act as stops for the limited pivotability of the half yokes within this profile piece.

In a preferred embodiment of the tool system for the tool for demounting shock absorber closure screws, the pins or depressions are integrally connected to a polygon which is arranged with radial symmetry about the opening, and the pins or depressions are rigidly designed and project out of a planar support surface.

This special design of the tool of the tool system makes it possible to exert a high torque. This is favored in that the polygon is arranged with radial symmetry (centrally) about the opening for the shock absorber piston rod to pass through, and the pins project out of a planar support surface. This makes it possible to set the tool firmly abutting on the shock absorber closure screws, so that tilting moments are prevented. The polygon rigidly connected to the tool, preferably a square or a hexagon, makes possible direct connection to a tool which can exert a high torque, for example to a socket wrench, or an impact wrench drive electrically or by compressed air.

The problem is solved for a tool, in particular for a tool system for demounting and mounting shock absorber parts to change shock absorber cartridges in shock absorbers, for mounting and demounting shock absorber closure screws, in that the pins or the depressions are integrally connected to a polygon which is arranged with radial symmetry about the openings, and that the pins or depressions are rigidly designed and project out of a planar support surface.

The special design of the tool makes it possible to exert a high torque. This is favored in that the polygon is arranged with radial symmetry (centrally) about the opening for the piston rod of the shock absorber to pass through and the pins project out of a planar support surface. It is thus made possible for the tool to be set firmly abutting on the shock absorber screws, so that tilting moments are prevented. The polygon connected rigidly to the tool is preferably square or hexagonal and makes possible direct connection to a tool which can exert a high torque, for example a socket wrench or an impact wrench driven electrically or by compressed air.

The number of pins is generally 2, 3, 4 or 6, or an even multiple of these values. The corresponding shock absorber closure screws frequently have two or four slots or holes, which are arranged opposite each other or crosswise. Arrangements of slots or holes in the form of a regular hexagon are also frequently encountered on shock absorber closure screws. Shock absorber closure screws are also in use which have a central hole of hexagonal shape. Such shock absorber closure screws can also be demounted by a tool on which the pins are arranged in the form of a regular hexagon. For demounting such shock absorber closure screws with a hexagonal central opening, the pins of the tool can be connected by raised lands; in this case, the projections can have the same height as the pins. There hence results the arrangement of a projecting regular hexagon with a central hole for the piston rod of the shock absorber to be guided through.

Shock absorbers are also in use which have no completely planar surface. In such cases, it can be necessary to provide on the tool raised lands which abut on corresponding planar places of the shock absorber closure screws. The raised lands can also be placed such that they connect together the pins, which are arranged with regular geometry.

The tool of the tool system, according to the invention, has the advantage that tilting of the tool on release of the shock absorber closure screws is prevented. Provision of a planar support surface in connection with the central arrangement of the polygon results in a more secure arrest of the tool, leading to a firm seating on the shock absorber closure screw. Hence, damage to other parts and to the shock absorber itself, is no longer possible. Sagging of the tool onto the shaft seal is also prevented.

The invention is explained in detail below with reference to the attached drawings. FIGS. 1-22 show various embodiments of the tool for mounting and demounting shock absorber screws for the tool system according to the invention, and FIGS. 23-26 show the tool of the tool system for demounting and mounting the coil spring of a vehicle shock absorber leg.

In detail, the Figures show the following:

BRIEF DESCRIPTION OF THE DRAWINGS

BEST MODES FOR CARRYING OUT THE INVENTION

Referring now to the drawings wherein like reference numerals designate identical or corresponding parts throughout the various views, a tool system according to the invention is described in detail below with reference to the Figures.

A tool for demounting and mounting the coil spring according to FIGS. 23-26 will be described first. A respective tool for compressing the spring is shown on an upper and a lower turn of the coil spring (1) which is part of a vehicle suspension. The tool includes two spring clamps (3) which engage oppositely on the coil spring (1) and each of which has a threaded spindle (4), at the upper end of which is fitted a first spring engaging element (5). This first spring engaging element (5) consists of a hook (5), which is slightly curved towards the other end of the threaded spindle (4) and which is welded at its outer surface, for example, to the end of the threaded spindle (4). A second or lower spring engaging element (6) is arranged to be freely displaceable on the threaded spindle (4), and consists of a bushing (7) which is displaceable on the threaded spindle (4) and to which is welded a hook (8) which corresponds in its design to the first spring engaging element (5), but is opposite to this as regards its curvature.

Figure 23:
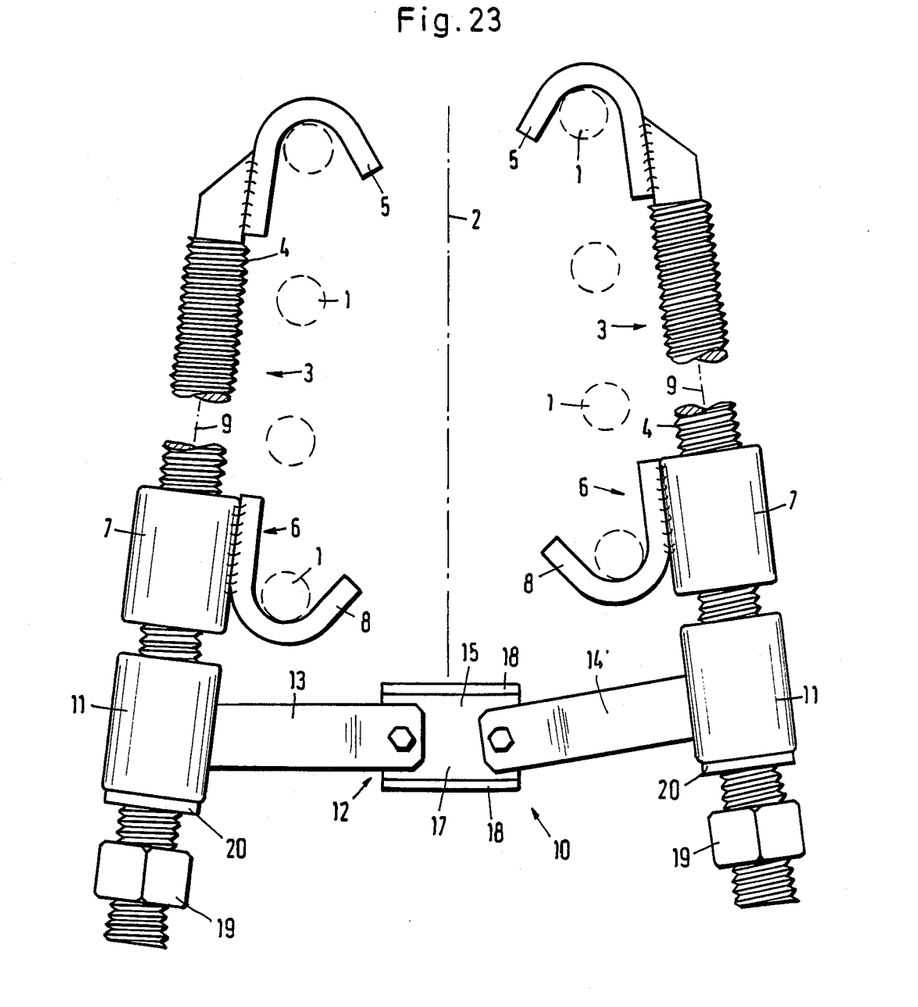
FIG. 23 shows an overall side view of the tool for demounting and mounting the coil spring on a coil spring, which is shown dashed, in section.

It can be seen from the structure shown in the drawings that the distance of the hook (8) of the second spring engaging element (6) from the axis (9) of the threaded spindle (4) is greater than the distance of the first spring engaging element (5) from the axis (9) of the threaded spindle, and in fact essentially by an amount which corresponds to the wall thickness of the bushing (7) together with the depth of the thread of the threaded spindle (4). There hence results, even with a cylindrical coil spring (1), an oblique positioning of the threaded spindle (4) with respect to the axis (2) of the coil spring on engagement of the tool with the coil spring, such that the threaded spindles have a greater distance from the axis (2) of the coil spring at their lower free ends than at their upper ends, which carry the first spring engaging elements (5). Under the considerable forces on compression of the coil spring (1), this oblique positioning of the spring clamps occurs of itself, and is not to be hindered by the spacer, which is yet to be described below. In the Figures, the result is, for example, that the left-hand spring engaging elements (5) engage in the deeper thread. This can in the same way be reversed.

Below the bushing (7) of the lower spring engaging elements (6), the spacer (10) is arranged on the threaded spindles (4). It consists of two cylindrical sleeves (11), which are connected together by a yoke (12), which is, for example, welded to the sleeves (11). The shape of the yoke (12) is better seen from FIG. 24. The sleeves (11) are dimensioned in their internal diameter such that they can easily move back and forth on the threaded spindles (4), but do not have an unnecessarily large play, since otherwise there is a danger that the sleeves might catch with their edges in the threads of the threaded spindles.

Figure 24:
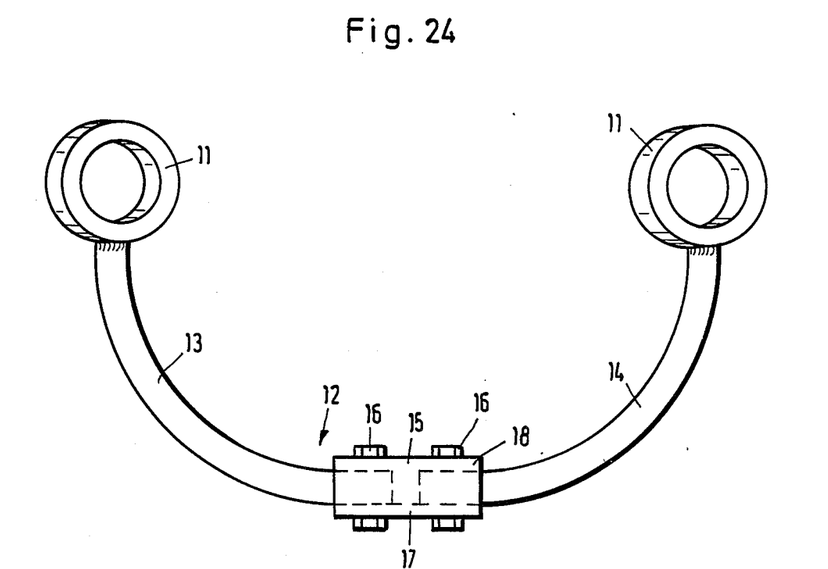
FIG. 24 shows a plan view of the spacer according to FIG. 23.
Figure 25:
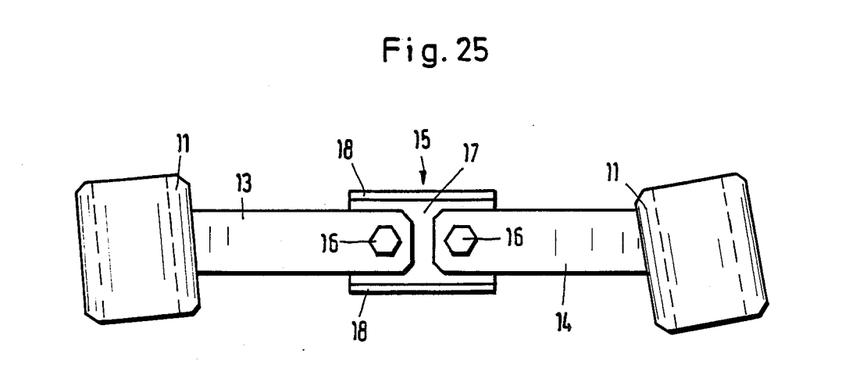
FIG. 25 shows a side view of the spacer according to FIG. 24.
Figure 26:
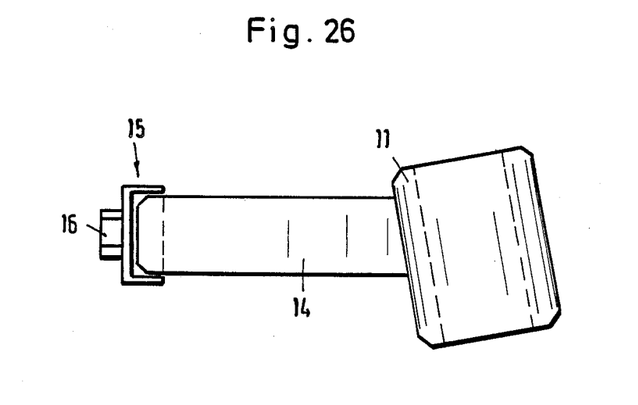
FIG. 26 shows a side view from the right of the spacer according to FIG. 24.

As can be seen from the drawings, the yoke (12) consists of two half yokes (13) and (14), which are bent, in the exemplary embodiment, from a right-angled steel profile and are connected together at their free ends by a U-profile piece (15). This connection is effected by a screw (16) each, by which the end of the respective half yoke (13) (14) is screwed against the inner side of the base (17) of the U-profile piece (15). The free ends of the half yokes (13) and (14) remote from the cylindrical sleeves (11) have a certain mutual spacing on the U-profile piece (15), and the internal width of the U-profile piece (15) between its shank parts (18) is somewhat greater than the width of the half yokes (13), (14). The half yokes (13), (14) thereby receive a certain motion play within the U-profile piece (15), in that they are pivotable about the axes of their respective screws (16) on the U-profile piece until they come to abut against the shank parts (18) of the U-profile piece, which thus act as limiting stops for the pivoting motion of the half yokes. The distance between the half yokes and the shank parts is shown disproportionally large in these Figures.

Returning to FIG. 23, finally, further screw elements (19) are arranged below on the threaded spindles (4) in the form of nuts, with which the spacer (10) and the second spring engaging elements (6) can be pushed forward in the direction towards the first spring engaging elements (5). Further, brass washers (20) are arranged between the sleeves (11) of the spacer (10) and the nuts (19), and are to take up the effects of wear due to the relative motion between the nuts (19) and the sleeves (11). Of course, the screw elements (19) should be about evenly tightened.

The sleeves (11) of the spacer (10) additionally insure that the nuts (19) always have a given distance from the sleeves (7) of the lower spring engaging elements (6). This facilitates the manipulation of the tool. Since the tool is used on the built-in suspension of the vehicle, it is generally located in a nearly vertical position. The coil spring (1) then rests, with the tool fitted to it, on the plate, arranged below the spring, of the suspension, because of which the lower spring engaging elements (6) are located, during the operation with the tool, essentially always at the same height position, and only the upper spring engaging elements (5) are moved downwards on compression of the spring with the spindles. This means that the spacer (10) also remains in about the same height position, and in fact at the height position of the said plate. The sleeves (11) of the spacer then cause the nuts (19) to be located below the plate edge and hence to be easily accessible for the use of a wrench.

A consequence of the above is that the spacer as a whole must be dimensioned such that its yoke lies outside the plate periphery. The yoke then essentially lies in a plane which is oblique to the axis of the coil spring (1).

Figure 1A:
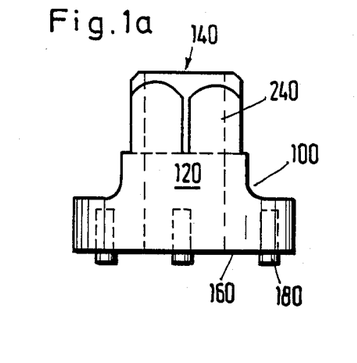
FIGS. 1a, b and c show an embodiment with four geometrically arranged pins.

It has already been mentioned above that in the embodiment of the tool according to FIG. 1, the spring clamps positively adjust during use to about the oblique position shown. The spacer is now designed such that it can match this oblique position of the threaded spindles. This purpose is chiefly served by the design of the yoke of the spacer in the form of two half yokes, articulated together with a limited pivot angle by the U-profile piece (15). As can be seen from FIGS. 24 and 25, the sleeves (11) are additionally fastened in inclined position to the half yokes (13) and (14). The inclination of the axes of the sleeves with respect to the yoke is then such that the axes are at an angle to the normal to the plane of the yoke, and these angles lie in a common plane. An example of an embodiment is shown in FIGS. 24 and 25, with the two sleeves (11) embodied in fact at different inclinations but in the same sense. This can be convenient, since due to the inclination of the turns of the coil spring (1), the two spring clamps are basically located at somewhat different height positions, which can be considered due to this oblique position of the sleeves (11) of the spacer (10). The point is essentially that the spacer (10) can be displaced without hindrance on the two threaded spindles, even with an oblique position of the threaded spindles (4), where this oblique position changes with further movement of the spring engaging elements together.

According to the size of the tool, at least one sleeve is additionally inclined in a plane which is perpendicular to the plane of inclination described above, so that the upper spring engaging element (5), which has a planar longitudinal extension, can adapt to the inclination of the spring turn. A sleeve (11) in connection with the yoke (12) is shown in FIG. 26 with the inclination as described. Small tolerances can then be compensated for by the pivoting motion of the half yokes. An upper spring engaging element (5) is thereby prevented from jumping out of engagement, when tightened, due to a large inclination of the spring (1).

All models currently provided with these shock absorbers can be serviced with only three embodiments, by means of the design of the tool for the coil springs as described above. In these embodiments, the dimensions in the Table are set up. The tool is designed such that the left-handed engaging elements engage in the lower, and the right-hand engaging elements, according to FIGS. 23-25, in the upper spring turns. By placing the yoke on a horizontal, planar surface, so that the sleeves project over the edges of the surface, the approximate deviation of the axes of the sleeves (11) from the position perpendicular to the support surface was measured. For this it is assumed that the intersection of the vertical axis of the respective sleeve to the support surface with the horizontal axes assumed to lie in the support surface from the origin of a system of axes, with one horizontal axis running parallel to the line joining the points of application of the yoke and the other perpendicular to this. The origin of the system of axes lies within the respective sleeve, and the axis parallel to the line joining the points of application will be termed the Z axis and the axis perpendicular to it, the Y axis. With reference to FIG. 23, the Z axis is taken as positive towards the right, and the Y axis positive going into the plane of the drawing. The deviations of the sleeve axes from the vertical are given by a positive or negative number of degrees, corresponding to the direction.

According to FIG. 23, in the present example of an embodiment the left-handed sleeve is situated lower on the coil spring and the right-hand sleeve is situated higher. With another, corresponding, tool this can be reversed.

In the embodiments set out in the Table given on the next page, sleeves with a length of 36 mm an external diameter of 28 mm and an internal diameter of 18 mm were used, with a diameter of 17 mm of the threaded spindle (4). The width of the yoke (9) was 22 mm, and the internal width of the U-profile piece 15 was 25 mm, with a width of the shank part 18 of 4 mm. The longitudinal extension of the spring engaging elements was 25 mm.

Figure 1B:
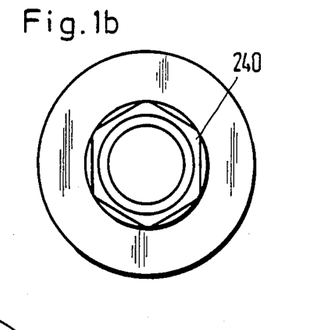
Figure 1C:
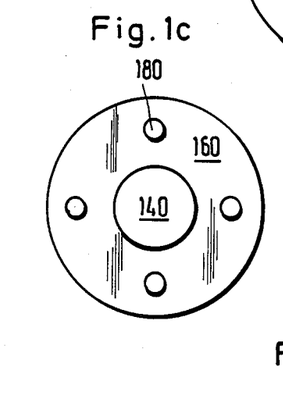

As can be gathered from the Table, the length of the U-profile piece at two screw sizes is equal, but in this case, the spacing of the screws is different. Nearly all sleeves are inclined in two directions, in regard to the coil slope and better mountability. The upper (right-hand) sleeve always has the same deviation with respect to the coil screw slope, for all sizes of coil spring, while a deviation out of the vertical with reference to the oblique arrangement for better mounting is only given with the two smallest coil spring diameters. With even greater coil spring diameters, this deviation can become negative. Small tolerances can always be compensated for, as already mentioned, by the pivotable mounting of the half yokes. The lower (left-hand) sleeve has considerably greater deviations from the normal, which depend on the size of the coil spring. The deviation from the normal due to the oblique position of the threaded spindles increases with increasing coil spring diameter.

and 1b, four pins (180), arranged regularly geometrically crosswise, project out of the lower support surface (160).

The whole tool is made integrally from a resistant material, such as tool steel. However, it can also be first made in individual parts and then assembled and firmly connected, for example, by welding and the like.

Figure 2A:
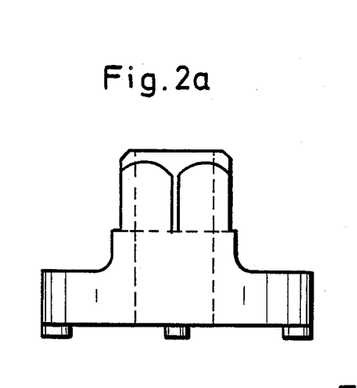
FIGS. 2a, b, c, through 6a, b c show further embodiments with four geometrically arranged pins.
Figure 2B:
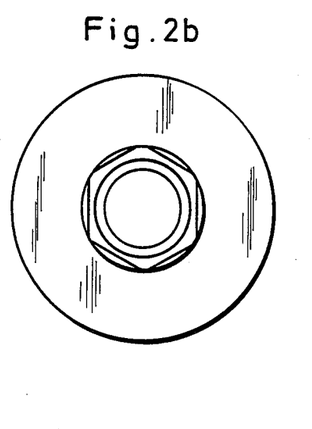
Figure 2C:
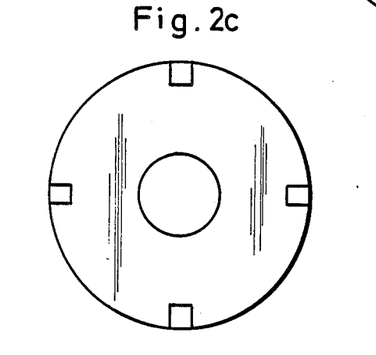
Figure 3A:
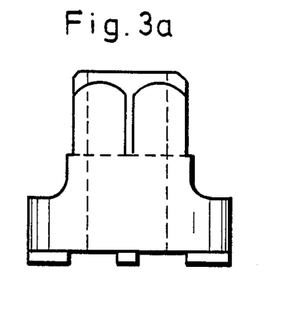
Figure 3B:
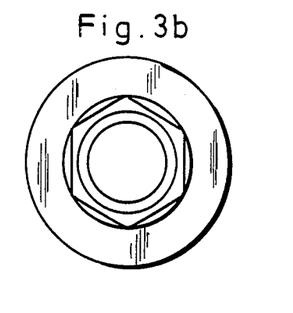
Figure 3C:
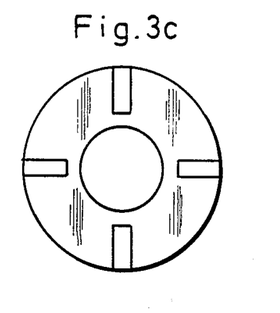
Figure 4A:
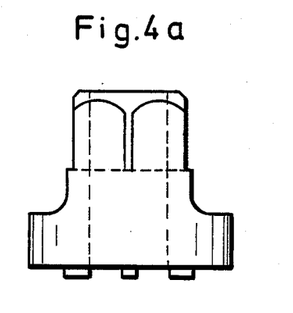
Figure 4B:
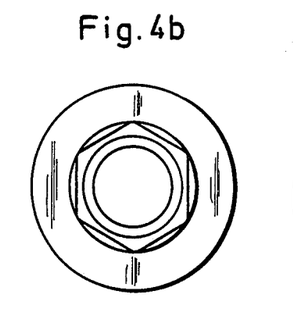
Figure 4C:
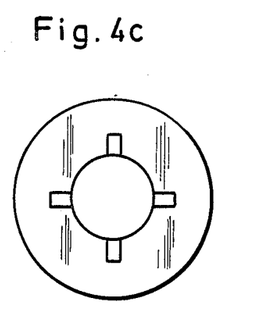
Figures 5A, 5B, 5C:
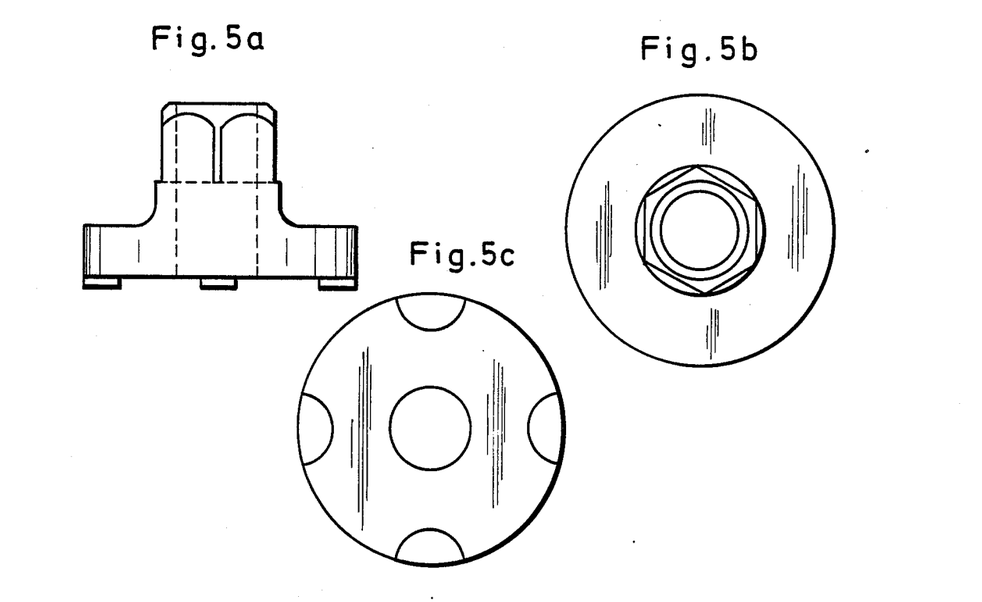
Figures 6A, 6B, 6C:
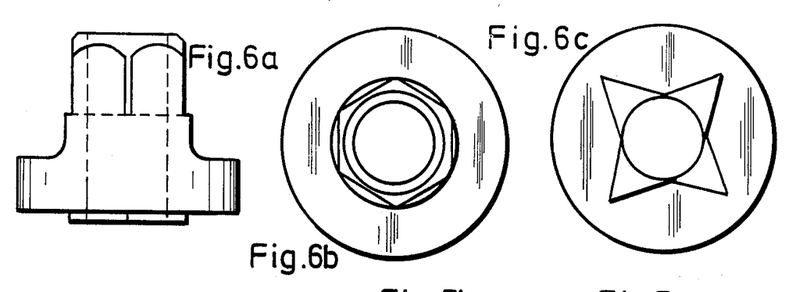
Figure 7A:
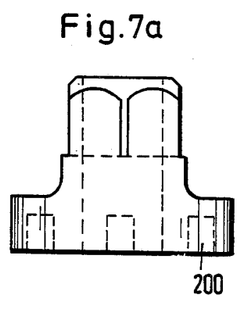
FIGS. 7a, b, c and 8a, b and c show embodiments with four geometrically arranged depressions.
Figure 7B:
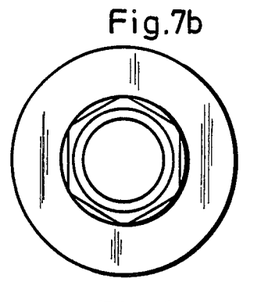
Figure 7C:
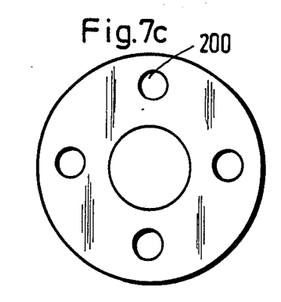
Figure 8A:
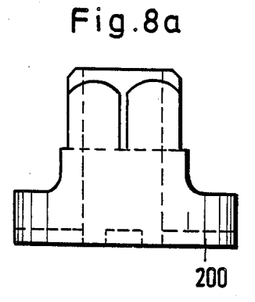
Figure 8B:
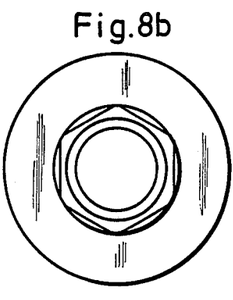
Figure 8C:
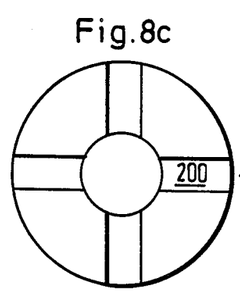

FIGS. 2a, b, and c through 6a, b, and c show further embodiments of the tool (100), which have four pins (180) arranged crosswise. The pins have a round cross section in FIGS. 1a, b, and c; a semicircular cross section in FIGS. 5a, b, and c; a square cross section in FIGS. 2a, b, and c; a rectangular cross section in FIGS. 3 through 4a, b, and c; and an approximately triangular cross section in FIGS. 6a, b, and c. In FIGS. 6a, b and c, the four pins are connected together on a respective common connecting lines. FIGS. 7a, b, and c show four circular depressions (200); FIGS. 8a, b, and c show four rectangular depressions (200).

Figure 9A:
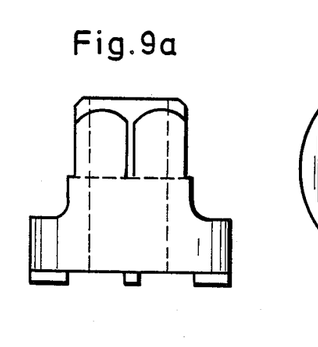
FIGS. 9a, b, c through 11a, b, c show embodiments with three geometrically arranged pins.
Figure 10A:
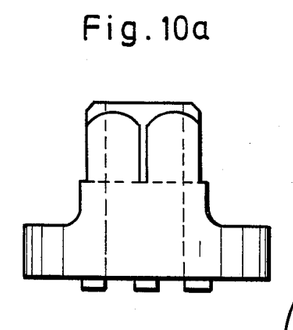
Figures 10B, 10C, 11B, 11C:
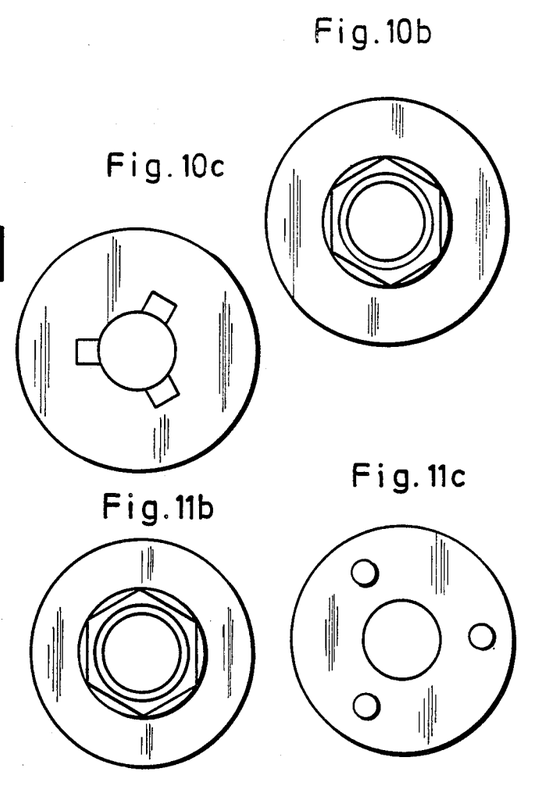
Figure 11A:
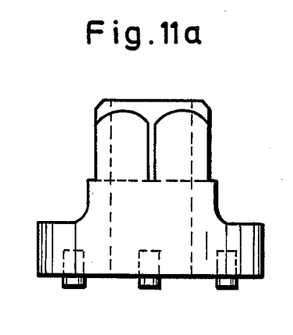
Figure 12A:
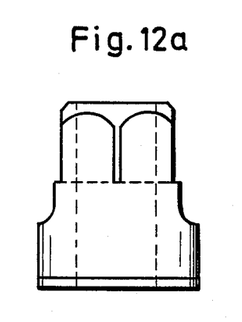
FIGS. 12a, b, c through 14a, b, c show embodiments with two geometrically arranged pins, in FIGS. 14a, b, c, the two pins are connected by a circular raised land.
Figure 12B:
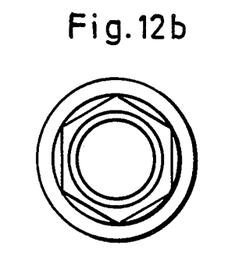
Figure 12C:
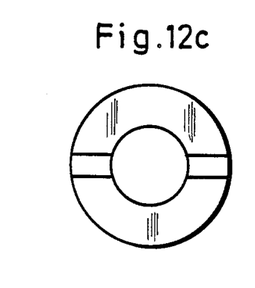
Figures 13A, 13B:
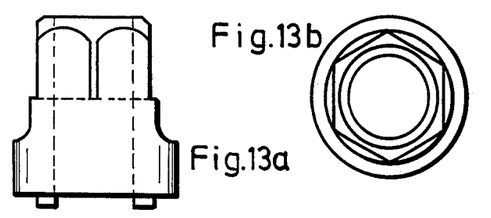
Figure 13C:
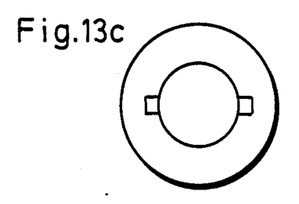
Figure 14A:
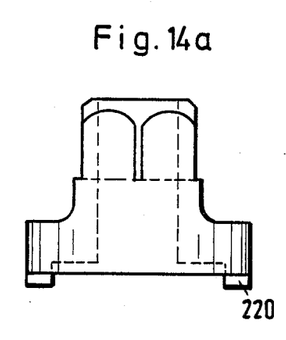
Figure 14B:
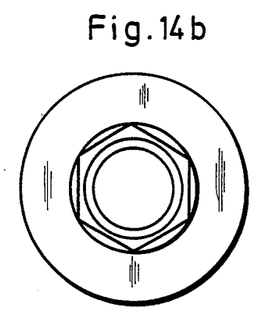
Figure 14C:
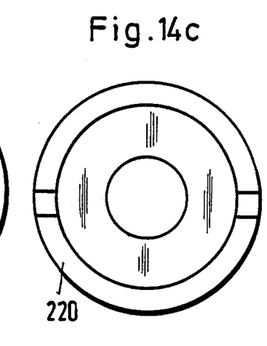

FIGS. 9a, b, and c show embodiments of the tool according to the invention, with three geometrically arranged pins, which have in FIGS. 9a b, and c, a rectangular contour, in FIGS. 10a, b, and c, an approximately square cross section, and in FIGS. 11a, b, and c, a circular contour. FIGS. 12a, b, and c through 14a, b, and c show embodiments of the tool with two geometrically arranged pins; those in FIGS. 12a, b, and c are of rectangular cross section, and in FIGS. 13a, b and c of square cross section. In FIGS. 12a, b and c, the pins reach over the whole width of the support surface, while in FIGS. 13a, b and c they reach over only a part of the support surface. FIGS. 14a, b and c likewise show an embodiment of the tool with two geometrically arranged pins, which are connected together by a raised land (22), which is arranged on the outer edge of the circular contour of the tool.

Figure 15A:
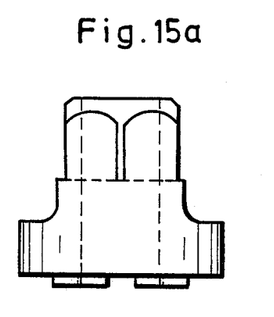
FIGS. 15a, b, c show an embodiment with six geometrically arranged pins.
Figure 15B:
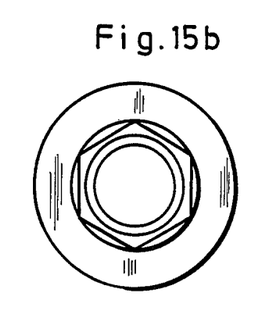
Figure 15C:
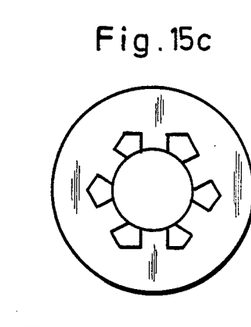
Figure 20A:
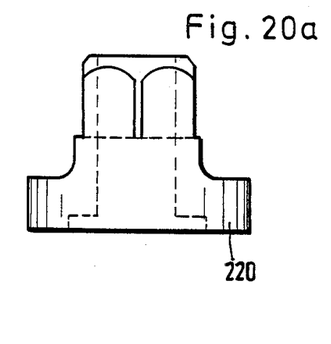
Figure 20B:
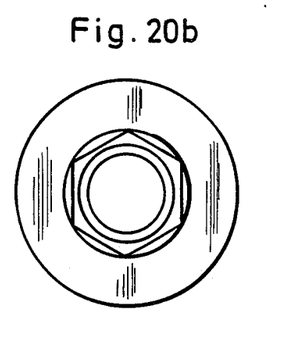
Figure 20C:
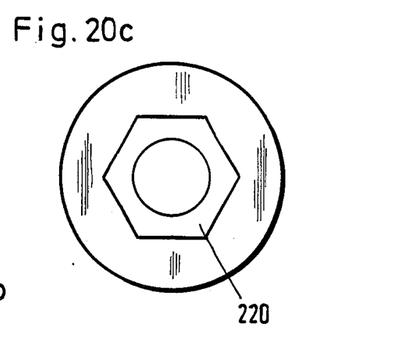
Figure 21A:
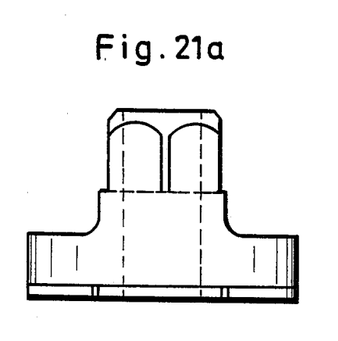
Figure 21B:
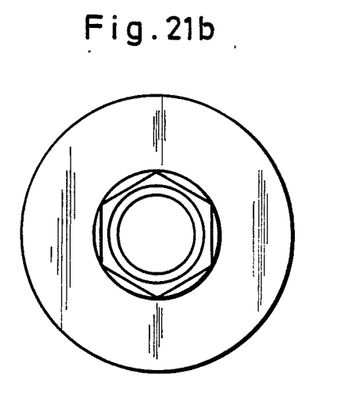
Figure 21C:
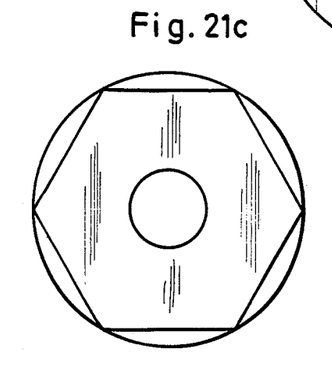

FIGS. 15a, b and c show an embodiment of the tool with six geometrically arranged pins, which have an approximately pentagonal contour. The pins are not connected together. If these pins are connected together by a raised land (220), a design of the tool results according to FIGS. 20a, b and c.

TABLE

| Spring Diameter (mm) | U-Profile Piece Length (mm) | Left Sleeve Approx. Deviation Sleeve Axis in Direction of | | Right Sleeve Approx. Deviation of Sleeve Axis in Direction of | |
|---|---|---|---|---|---|
| | | Y axis | Z axis | Y axis | Z axis |
| 136 | 75 | +12 | +8 | −3 | +7 |
| 143 | 75 | +14 | +10 | −3 | +7 |
| 165 | 110 | +14 | +12 | −3 | — |

The deviations from the normal due to the inclination of the coil spring turns also essentially increases with increasing coil spring diameter.

The described tool with the spacer connecting the two spring clamps insures a secure compression of the coil spring on the suspension of a vehicle, the whole tool being designed such that it insures the trouble-free carrying out of this work on the built-in suspension of the vehicle. After compression of the coil spring, as the next step in demounting the shock absorber closure screws must be released with a further tool (100) of the tool system, so as to then demount the coil spring with the whole spring clamp, followed by changing the shock absorber cartridge and carrying out the process of reassembly in the reverse order.

Figure 16A:
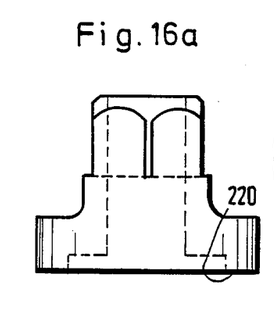
FIGS. 16a, b, c and 17a, b, c show embodiments with eight geometrically arranged pins.
Figure 16B:
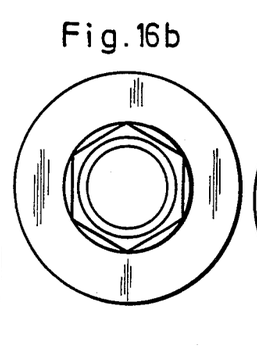
Figure 16C:
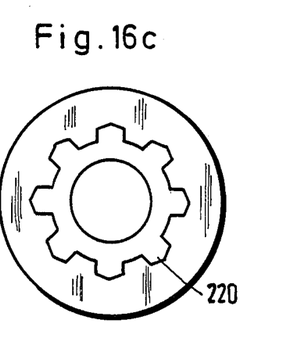

The tool (100) consists of a massive tool body (120) with a central bore (140) and a lower, planar support surface (160). In the embodiment according to FIGS. 1a FIGS. 16a, b and c show an embodiment of the tool with eight geometrically arranged pins, which are connected together by a raised land (220) which does not take up the full width of the pins.

Figure 17A:
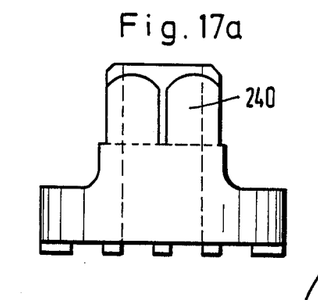
Figure 17B:
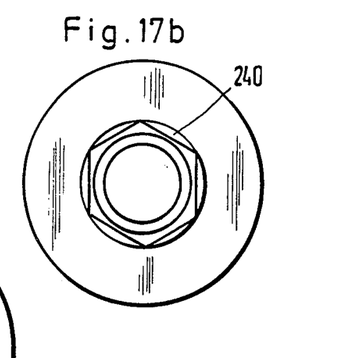
Figure 17C:
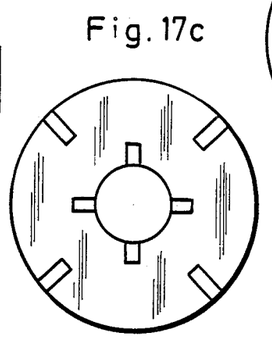

FIGS. 17a, b and c show an embodiment with a total of eight pins, which are arranged in the form of two groups of four, of rectangular or square contour.

Figure 18A:
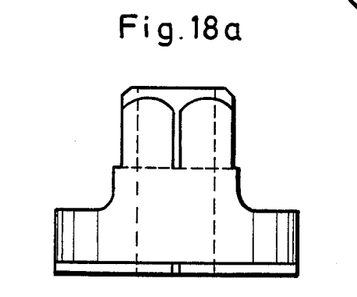
FIGS. 18a, b, c show an embodiment with four geometrically arranged pins, which are connected together by projections.
Figure 18B:
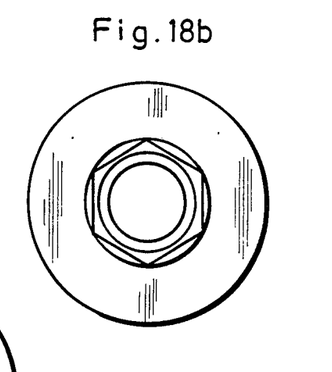
Figure 18C:
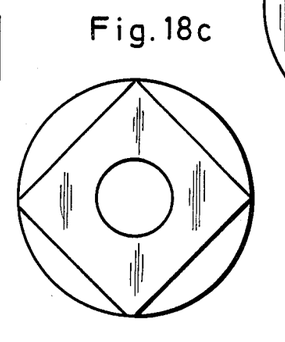
Figure 19A:
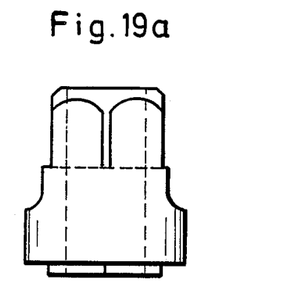
FIGS. 19a, b, c through 21a, b, c show embodiments with six geometrically arranged pins, which are connected together by projections.
Figure 19B:
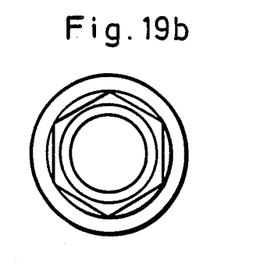
Figure 19C:
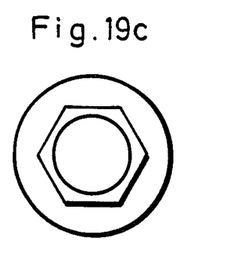
Figure 22A:
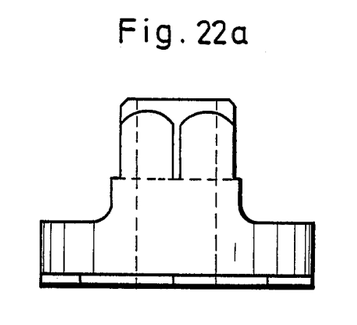
FIGS. 22a, b, c show an embodiment with eight geometrically arranged pins, which are connected together by projections.
Figure 22B:
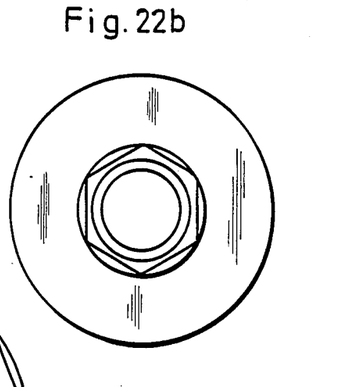
Figure 22C:
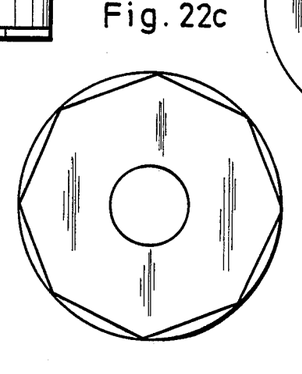

FIGS. 18a, b and c show an embodiment of the tool with four geometrically arranged pins, which are connected together by projections which have the same height as the pins. Correspondingly, FIGS. 19a, b and c through 21a, b and c show embodiments of the tool with six geometrically arranged pins, which are connected together by six equally high projections. An embodiment of the tool with eight geometrically arranged pins with connecting projections of the same height is shown in FIGS. 22a, b and c.

The central bore (140) which acts as the passage opening for the shock absorber piston rod, is clearly visible in all the Figures. The polygon (240) can be seen at the upper part of this passage opening and is designed in the exemplary embodiments of the Figures as an external hexagon. In a further preferred embodiment of the invention, however, it can also be designed as a recessed square. The cross section of the tool widens out below the hexagon; the wall of the tool runs into a bend from a perpendicular direction at first, gradually merging into the horizontal, and forms a floor portion with a support surface (160), from which the projections (220) project or into which the depressions (200) are incorporated. The whole arrangement of the tool is centrally symmetrical about the central bore (140), and the rotation axes of the symmetrical body have a symmetry whose index equals the number of pins or a fraction thereof.

The described tool system for demounting and mounting shock absorbers makes possible a simple change of the shock absorber cartridge in a shock absorber built into a vehicle, so that the work time and hence the costs of a change are reduced and at the same time better safety is insured for the personnel working on the vehicle.

Obviously, many modifications and variations of the present invention are possible in light of the above teachings. It is therefore to be understood that, within the scope of the appended claims, the invention may be practiced otherwise than as specifically described.

I claim:

1. An apparatus for installing or removing shock absorbers from a vehicle having a frame and a suspension system of a type including a link member operatively pivotally attached to the frame and having a ground engaging wheel operatively rotatively attached to said link member; a coil spring in operative engagement with the link member at the bottom thereof and operatively biasing the vehicle body upwardly at the top end thereof; and a shock absorbing type damper means disposed within the coil spring operatively attached at the bottom thereof to the link member and operatively attached at the top thereof to the vehicle body for dampening the relative movement between the body and the link member; said apparatus comprising:

a first shaft disposed along a first longitudinal axis;

first upper coil engaging means connected to said first shaft for extending over and engaging a top portion of one side of said coil spring;

a second shaft disposed along a second longitudinal axis;

second upper coil engaging means connected to said second shaft for extending over and engaging a top portion of the other side of said coil spring;

first lower coil engaging means slidably disposed on said first shaft for operatively engaging a lower portion of said one side of the coil spring, said first lower coil engaging means being dispose farther away from said first longitudinal axis than said first upper coil engaging means;

second lower coil engaging means slidably disposed on said second shaft for operatively engaging a lower portion of the other side of the coil spring, said second lower coil engaging means being disposed farther away from said second longitudinal axis than said second upper coil engaging means;

yoke means operatively slidably disposed on both of said first and second shafts below said first and second lower engaging means, said yoke means being separate from said first and second lower coil engaging means said yoke means extending around one side of said coil spring, said yoke means including a first sleeve slidably disposed around the first shaft and a second sleeve slidably disposed on the second shaft, a first arm rigidly attached at one end thereof to said first sleeve at an acute angle with respect to said first longitudinal axis and a second arm rigidly attached at one end thereof to said second second sleeve at an acute angle with respect to said second longitudinal axis, and means for operatively pivotally attaching the other ends of said first and second arms together; and means for moving said yoke means with respect to said first and second shafts for selectively and alternatively forcing said first and second lower coil engaging means towards said first and second upper coil engaging means to thereby compress said coil spring and allow said shock absorbing damper means to be removed or permitting said first and second lower coil engaging means to move away from said first and second upper coil engaging means once a shock absorbing damper means is installed within said coil spring.

2. The apparatus of claim 1 wherein said yoke moving means comprises threads on said first and second shaft and threaded nuts rotatably attached to said shafts whereby rotation of the nuts in one direction will force the yoke upwardly and rotation of the nuts in the other rotary direction will cause the yoke to move downwardly.

3. The apparatus of claim 1 wherein said pivoting means comprises a bracket member, a first pin means disposed along a first substantially horizontal axis extending through openings in one end of the bracket member and the other end of the first arm for permitting the first arm means to pivot with respect to said bracket member; a second pin means disposed along a second substantially horizontal axis and extending through openings in the other end of the bracket member and the other end of the second arm means for permitting the second arm means to pivot with respect to said bracket member.

4. The apparatus of claim 3 including first stop means disposed on said one end of said bracket member to limit pivoting of said first arm with respect to said bracket member.

5. The apparatus of claim 4 including second stop means disposed on the other end of said bracket member for limiting the amount of pivoting of said second arm with respect to said bracket member.

6. The apparatus of claim 1 wherein said first and second arms are generally arcuate in shape to extend around one side of said coil spring.

* * * * *